# United States Patent
Konishi et al.

(10) Patent No.: US 7,981,964 B2
(45) Date of Patent: Jul. 19, 2011

(54) THERMOSETTING PAINT COMPOSITIONS

(75) Inventors: Tetsu Konishi, Kanagawa (JP); Shinji Mitsumune, Kanagawa (JP); Masayuki Takemoto, Yokohama (JP); Takehito Ito, Tokyo (JP); Hiroyuki Tagkagi, Yokohama (JP); Rui Nimi, Munster (DE)

(73) Assignee: BASF Coatings Japan Ltd., Yokohama-shi (JP)

( * ) Notice: Subject to any disclaimer, the term of this patent is extended or adjusted under 35 U.S.C. 154(b) by 692 days.

(21) Appl. No.: 11/917,360

(22) PCT Filed: Jun. 13, 2006

(86) PCT No.: PCT/IB2006/001665
§ 371 (c)(1),
(2), (4) Date: Dec. 13, 2007

(87) PCT Pub. No.: WO2006/134488
PCT Pub. Date: Dec. 21, 2006

(65) Prior Publication Data
US 2010/0130668 A1    May 27, 2010

(30) Foreign Application Priority Data
Jun. 16, 2005 (JP) ................... 2005-176181

(51) Int. Cl.
C08F 212/08 (2006.01)
C08F 8/16 (2006.01)
C08F 220/20 (2006.01)
(52) U.S. Cl. ............ 525/123; 525/386; 560/189
(58) Field of Classification Search .............. 524/507; 525/123, 386; 560/189
See application file for complete search history.

(56) References Cited

U.S. PATENT DOCUMENTS 4,916,254 A * 4/1990 Watanabe et al. ............. 560/185
6,652,971 B1 * 11/2003 Delmotte et al. ............. 428/413

FOREIGN PATENT DOCUMENTS

| EP | 1479704 A | | 11/2004 |
| JP | 60031579 A | * | 2/1985 |
| JP | 4366191 A | | 12/1992 |
| JP | 05-171103 | | 7/1993 |
| JP | 09-157589 | | 9/1997 |
| JP | 2002105397 A | | 4/2002 |
| JP | 2003313493 A | | 11/2003 |
| JP | 2004314060 A | | 11/2004 |
| WO | WO0138415 A1 | | 5/2001 |

OTHER PUBLICATIONS

JP 60031579 A, Feb. 1985, Morita et al., English Translation.*
Database WPI Week 198513, Derwent Publications Ltd., London, GB; AN 1985-078371; XP002426676 & JP 60 031579 A (Dainippon Ink & Chem KK) Feb. 18, 1985 abstract.
International Search Report for PCT/IB2006/001665.
International Preliminary Report on Patentability for International application No. PCT/IB2006/001665 dated Dec. 17, 2007.
DATABSE WPI Week 199305; Derwent Publications Ltd., London, GB; AN 1993-040738.

* cited by examiner

*Primary Examiner* — Satya B Sastri
(74) *Attorney, Agent, or Firm* — Cantor Colburn LLP

(57) ABSTRACT

Disclosed herein is a heat-hardenable paint composition comprising a base resin, wherein the base resin comprises (A) a lactone modified resin comprising hydroxyl groups, wherein 20 to 70 weight percent of the structural units are based on the lactone compound, and the hydroxyl group value is from 50 to 400 mgKOH/g, and (B) an acrylic resin comprising hydroxyl groups and cyclic structures, wherein 10 to 80 weight percent of structural units are based on a radically polymerizable monomer comprising a cyclic structure, the hydroxyl group value is from 50 to 150 mgKOH/g, and the crosslinking resin is an isocyanate compound, wherein the weight ratio of the solid fractions of (A):(B) in the base resin is from 95:5 to 20:80.

6 Claims, No Drawings

THERMOSETTING PAINT COMPOSITIONS

CROSS REFERENCE TO RELATED APPLICATIONS

This application is a National Phase Application of Patent Application PCT/IB2006/001665, filed on Jun. 13, 2006, which claims priority to JP 2005-176181, filed on Jun. 16, 2005.

TECHNICAL FIELD

The invention concerns thermosetting paint compositions with which paint films which have excellent scratch resistance, acid resistance and durability and which also have excellent staining resistance can be formed and which can be used ideally as top-coat paints for automobiles.

BACKGROUND

Paint compositions comprising hydroxyl group containing acrylic resins and crosslinking agents which have functional groups which react with hydroxyl groups are widely used in the automobile painting field. Conventionally, copolymers of radically polymerizable monomers which have hydroxyl groups and other copolymerizable monomers have been used in the main for the hydroxyl group containing acrylic resins which are used in these paint compositions, but more recently a demand has arisen in the automobile painting field for paints, and especially clear paints, where the paint film has acid rain resistance and scratch resistance, and the development of paints which form paint films which have excellent scratch resistance and durability has become a pressing need.

Paint compositions which have as essential components (A) an acrylic copolymer of acid value from 25 to 125 mgKOH/g and hydroxyl group value of from 30 to 150 mgKOH/g which includes (meth)acrylic acid derivative monomer units and (B) an acrylic copolymer of acid value from 230 to 1500 and hydroxyl group value from 30 to 150 mgKOH/g which includes unsaturated monomer units which have epoxy groups, where the components (A) and (B) are copolymers which may include unsaturated monomers which are ε-caprolactone modified forms of acrylic monomers which have hydroxyl groups, and, moreover, (C) amino resin are known as a method of obtaining paint films which have excellent acid resistance and scratch resistance (for example, see Japanese Unexamined Patent Application Laid Open H5-171103). However, with these paint compositions there is a weakness in that it is difficult to provide a paint film with both scratch resistance and staining resistance.

Furthermore, high solid fraction paint compositions which contain (A) from 5 to 30 wt % of hydroxyl group containing lactone modified oligomer of weight average molecular weight not more than 1000 and hydroxyl group value from 200 to 800 mgKOH/g, (B) from 5 to 50 wt % hydroxyl group containing resin of weight average molecular weight from 1000 to 6000 and hydroxyl group value from 50 to 200 mgKOH/g, (C) from 30 to 70 wt % of polyisocyanate compound and (D) from 3 to 30 wt % melamine resin are known as paint compositions which have a high solid fraction and of which the finished appearance of the paint film, paint film hardness and the acid rain resistance and scratch resistance of the paint film are excellent, using two types of hydroxyl group containing resin in the same way (for example, see Japanese Unexamined Patent Application Laid Open 2002-105397). However, with these paint compositions there is a weakness in that the staining resistance of the paint film is inadequate.

Furthermore, paint compositions which have as essential components (a) from 30 to 90 parts by mass of a lactone modified acrylic polyol resin which has been obtained by the ring-opening addition reaction in the absence of a catalyst on adding from 10 to 200 parts by mass of lactone compound to 100 parts by mass of an acrylic polyol resin of which the hydroxyl group value is from 75 to 250 mgKOH/g and the acid value is from 0.5 to 50 mgKOH/g, (b) from 10 to 70 parts by mass of polyisocyanate compound and (c) from 0.01 to 20 parts by mass of a specified alkoxysilane partially hydrolyzed condensate are known as paint compositions where the staining resistance and impact resistance of the paint film are excellent and where at the same time the external appearance, weather resistance, water resistance and the like are also excellent (for example, see Japanese Unexamined Patent Application Laid Open 2003-313493). However, these paint compositions have a weakness in that the re-coating adhesion properties are inadequate.

Furthermore, a resin composition for painting purposes which contains a starburst-type polyester oligomer of number average molecular weight from 1,500 to 15,000 of which the aromatic ring content is from 0.9 to 3.3 rings/kg of resin, the lactone content is from 20 to 60 wt %, the hydroxyl group value is from 56 to 300 mgKOH/g and which has a plurality of radial branches from a supposed central molecule with a further plurality of branches from each branch, and a hardening agent selected from among the group comprising aminoplast resin, isocyanate pre-polymer and blocked isocyanate pre-polymer are known as paint compositions where the paint film is provided with flexibility (for example, see Japanese Unexamined Patent Application Laid Open H9-157589). However, these paint compositions have a weakness in that the weather resistance of the paint film is inadequate when they are used as top-coat paints on automobiles.

Furthermore, a paint composition which contains a hydroxyl group containing acrylic resin (A) of which the hydroxyl group value is from 80 to 160 mgKOH/g which has been obtained by the radical copolymerization of (a) from 8 to 30 wt % of primary hydroxyl group containing monomer selected from among 4-hydroxybutyl(meth)acrylate and the ε-caprolactone modified vinyl monomers obtained by bringing about the ring-opening polymerization of ε-caprolactone with a hydroxyalkyl(meth)acrylate), (b) from 10 to 40 wt % of a secondary hydroxyl group containing monomer and (c) from 30 to 82 wt % of other polymerizable unsaturated monomer, and a hardening agent (B), and which contains from 60 to 90 wt % of the acrylic resin (A) and from 10 to 40 wt % of the hardening agent (B) on the basis of the total solid fraction of the acrylic resin (A) and the hardening agent (B) is known as a clear paint composition which has excellent low temperature hardening properties, paint film adhesion and finish for example (for example, see Japanese Unexamined Patent Application Laid Open 2004-314060). However these paint compositions have a weakness in that the scratch resistance of the paint film is inadequate.

SUMMARY

The invention provides thermosetting paint compositions with which paint films which have excellent scratch resistance, acid resistance and durability and which also have excellent staining resistance can be formed and which are ideal for use as top-coat paints for automobile purposes.

MEANS OF RESOLVING THESE PROBLEMS

The inventors have discovered that thermosetting paint compositions where a mixture of hydroxyl group containing lactone modified resin which contains structural units based on a lactone compound, and hydroxyl group and cyclic structure containing acrylic resin which includes structural units based on radically polymerizable monomers which have a cyclic structure is hardened using an isocyanate compound provide thermosetting paint compositions of which the paint films have excellent scratch resistance and durability and also have excellent staining resistance, and which can be used ideally as top-coat paints for automobile purposes, and the invention has been realized on the basis of these findings.

That is to say, the invention provides a heat-hardenable paint composition in which the base resin comprises (A) a hydroxyl group containing lactone modified resin which includes from 20 to 70 mass % of structural units based on a lactone compound and of which the hydroxyl group value is from 50 to 400 mgKOH/g and (B) a hydroxyl group containing acrylic resin which includes from 10 to 80 mass % of structural units based on radically polymerizable monomer which has a cyclic structure and of which the hydroxyl group value is from 50 to 150 mgKOH/g, and in which the crosslinking resin is an isocyanate compound, which is characterized in that the mass ratio of the resin solid fractions of (A)/(B) is from 95/5 to 20/80.

Furthermore, the invention provides a heat-hardenable paint composition where, in the abovementioned thermosetting paint composition, the radically polymerizable monomer which has a cyclic structure of (B) is one or more type of monomer selected from among the group comprising styrene, cyclohexyl methacrylate, cyclohexyl acrylate, isobornyl methacrylate and isobornyl acrylate.

Furthermore, the invention provides a heat-hardenable paint composition where, in the abovementioned thermosetting paint composition, the hydroxyl group containing lactone modified resin of (A) is a hydroxyl group containing lactone modified resin which includes from 20 to 70 mass % of structural units based on a lactone compound and of which the hydroxyl group value is from 50 to 400 mgKOH/g which has been obtained by subjecting a lactone compound to a ring-opening addition reaction with a hydroxyl group containing acrylic resin which has been obtained by copolymerizing a radically polymerizable monomer which has hydroxyl groups and other radically polymerizable monomer.

Furthermore, the invention provides a thermosetting paint composition where, in the abovementioned heat-hardenable paint composition, the hydroxyl group containing lactone modified resin of (A) is a hydroxyl group containing lactone modified resin which has been obtained subjecting a lactone compound to ring-opening addition reaction with a hydroxyl group containing resin which has been obtained by copolymerizing (a) an acid compound which has one carboxyl group and two or more hydroxyl groups, (b) a radically polymerizable monomer which has epoxy groups and (c) other radically polymerizable monomer, and of which the hydroxyl group value is from 50 to 400 mgKOH/g, and which includes from 20 to 70 mass % of cyclic units based on the lactone compound. Moreover, the invention provides a heat-hardenable paint composition where, in the abovementioned heat-hardenable paint composition, the acid compound of (a) is 2,2-dimethylolbutanoic acid or 2,2-dimethylol-propionic acid.

By using a thermosetting paint composition of this invention it is possible to obtain a paint film which has excellent scratch resistance, acid resistance and durability and which in addition has excellent staining resistance. The thermosetting paint compositions of this invention can be used as top-coat paints for automobile purposes.

DETAILED DESCRIPTION

The hydroxyl group containing lactone modified resin of (A) which is used in the invention is a resin of which the hydroxyl group value is from 50 to 400 mgKOH/g and which includes from 20 to 70 mass % of structural units based on a lactone compound.

The preferred range for the hydroxyl group value of the hydroxyl group containing lactone modified resin of (A) is from 100 to 350 mgKOH/g, and the most desirable range is from 150 to 330 mgKOH/g. In those cases where the hydroxyl group value of the hydroxyl group containing lactone modified resin of (A) is less than 50 mgKOH/g the weather resistance and acid resistance are inadequate, and in those cases where the hydroxyl group value exceeds 400 mgKOH/g the compatibility with the hardening agent is reduced and so there is a decline in the appearance of the paint film.

Furthermore, the preferred content of structural units based, on the lactone compound of the hydroxyl group containing lactone modified resin of (A) is from 20 to 60 mass %, and most desirably from 20 to 50 mass %. In those cases where the structural unit based on a lactone compound content is less than 20 mass % the scratch resistance of the paint film is inadequate, and in those cases where the structural unit based on a lactone compound content exceeds 70 mass % the staining resistance of the paint film is inadequate.

The weight average molecular weight of the hydroxyl group containing resin of (A) is preferably from 2,500 to 15,000, and most desirably from 2,500 to 12,000. In those cases where the weight average molecular weight is less than 2,500 the weather resistance of the paint film is low and in those cases where it exceeds 15,000 the appearance of the paint film declines.

The hydroxyl group containing lactone modified resin of (A) can be obtained by subjecting a lactone compound to a ring-opening addition reaction with a hydroxyl group containing resin which does not include structural units based on a lactone compound or with a hydroxyl group containing resin which does include structural units based on a lactone compound and, furthermore, it can be obtained by the copolymerization of a hydroxyl group containing radically polymerizable monomer on which a lactone compound has been caused to undergo a ring-opening addition reaction and other radically polymerizable monomers. The lactone compound ring-opening addition reaction is preferably carried out in the absence of a catalyst. Rubber elasticity is imparted to the hardened paint film which is formed from a top-coat paint composition of this invention as a result of the lactone modification, and a high degree of scratch resistance is achieved.

The hydroxyl group containing resins obtained by copolymerizing (a) an acid compound which has one carboxyl group and two or more hydroxyl groups, (b) a radically polymerizable monomer which has epoxy groups and (c) other radically polymerizable monomers can be cited as a hydroxyl group containing resins.

The hydroxyl group containing acrylic resins can be obtained by the radical polymerization of a mixture of hydroxyl group containing radically polymerizable monomer and other radically polymerizable monomer in the usual way in the usual organic solvents using the usual radical polymerization initiators. Moreover, in those cases where a lactone modified radically polymerizable monomer such as a (meth) acrylic acid ester which had been modified with a lactone compound is used, the monomer is used in the radical copolymerization as a hydroxyl group containing radically polymerizable monomer. In this case, when the lactone modified radically polymerizable monomer is copolymerized in such a way that the hydroxyl group value of the copolymer obtained is from 50 to 400 mgKOH/g and structural unit based on the lactone compound content is from 20 to 70 mass %, the copolymer obtained is a hydroxyl group containing lactone modified resin of this invention. The lactone modified radically polymerizable monomer is preferably a monomer where a lactone compound has been caused to undergo a ring-opening addition reaction with a hydroxyl group containing radically polymerizable monomer, and those where at least 3 mol of lactone compound have been added by ring-opening per 1 mol of hydroxyl group of the hydroxyl group containing monomer are preferred, those where at least 4 mol of lactone compound have been added by ring-opening are more desirable, and those where from 4 to 6 mol of lactone compound have been added by ring-opening are especially desirable.

Examples of a hydroxyl group containing radically polymerizable monomers include 2-hydroxyethyl acrylate, 2-hydroxypropyl acrylate, 3-hydroxypropyl acrylate, 2-hydroxybutyl acrylate, 4-hydroxybutyl acrylate, 6-hydroxyhexyl acrylate, acrylic acid and versatic acid glycidyl ester adducts, 2-hydroxyethyl methacrylate, 2-hydroxypropyl methacrylate, 3-hydroxypropyl methacrylate, 2-hydroxybutyl methacrylate, 4-hydroxybutyl methacrylate, 6-hydroxyhexyl methacrylate, methacrylic acid and versatic acid glycidyl ester adducts; and ethylene oxide and/or propylene oxide adducts of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate or 4-hydroxybutyl methacrylate. One of these hydroxyl group containing vinyl monomers may be used, or a combination of two or more types can be used.

Examples of the other radically polymerizable monomers include methyl acrylate, ethyl acrylate, n-propyl acrylate, isopropyl acrylate, n-butyl acrylate, isobutyl acrylate, sec-butyl acrylate, t-butyl acrylate, hexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, t-butyl methacrylate, hexyl methacrylate, 2-ethylhexyl methacrylate, octyl methacrylate, lauryl methacrylate, stearyl methacrylate, isobornyl methacrylate, perfluoroalkyl acrylates, perfluoroalkyl methacrylates, N-methylaminoethyl acrylate, N-dimethylaminoethyl methacrylate, acrylonitrile, methacrylonitrile, acrylamide, methacrylamide and vinyl acetate. Furthermore, acrylic acid, methacrylic acid, maleic acid, fumaric acid and the like which are carboxyl group containing radically polymerizable monomers can also be used. One of these radically polymerizable monomers can be used, or a combination of two or more types may be used.

Examples of the radical polymerization initiators include azo compounds such as 2,2'-azobisisobutyronitrile, 2,2'-azobis-2,4-dimethylvaleronitrile, 4,4'-diazo-4-cyanovaleric acid, 1-azobis-1-cyclohexane-carbonitrile and dimethyl-2,2'-azobisisobutyrate; and organic peroxides such as methyl ethyl ketone peroxide, cyclohexane peroxide, 3,5,5-trimethylhexane peroxide, 1,1-bis(t-butylperoxy)cyclohexane, 2,2-bis(t-butylperoxy)octane, t-butyl hydroperoxide, diisopropyl-benzene hydroperoxide, dicumyl peroxide, t-butyl cumyl peroxide, isobutyl peroxide, lauroyl peroxide, benzoin peroxide, diisopropyl peroxydicarbonate, t-butylperoxy 2-ethylhexanoate, t-butylperoxy neodecanoate, t-butylperoxy laurate, t-butylperoxy benzoate, t-butylperoxy isopropyl carbonate and t-butylperoxy acetate. One of these radical polymerization initiators may be used, or a combination of two or more types may be used.

No particular limitation is imposed upon the amount of radical polymerization initiator compounded, but an amount of from 0.01 to 20 mass % with respect to the total amount of radically polymerizable monomer is preferred. Furthermore, the radical polymerization temperature differs according to the type of radical polymerization initiator, but the polymerization is preferably carried out under conditions of from 50 to 200° C., and most desirably under conditions of from 80 to 160° C.

Examples of the organic solvents which can be used in the production of the abovementioned hydroxyl group containing resin include alicyclic hydrocarbons such as cyclohexane and ethylcyclohexane, aromatic hydrocarbon solvents such as toluene, xylene, ethylbenzene and aromatic naphtha, ketone solvents such as acetone, methyl ethyl ketone, methyl isobutyl ketone, cyclohexanone and isopherone, ester-based solvents such as ethyl acetate, n-butyl acetate, methoxypropyl acetate, isobutyl acetate, 3-methoxybutyl acetate and bis(2-ethylhexyl)adipate, ether based solvent such as dibutyl ether, tetrahydrofuran, 1,4-dioxane and 1,3,5-trioxane, and nitrogen-containing solvents such as acetonitrile, valeronitrile, N,N-dimethylformamide and N,N-diethylformamide. The organic solvent may be of one type alone or it may be a mixed solvent comprising a plurality of two or more types. At this time the solid fraction concentration of the hydroxyl group containing resin can be selected optionally within the range where the dispersion stability of the resin is not lost, but generally the solid fraction concentration is from 10 to 70 mass %.

Furthermore, the 2,2-dimethylolalcanoic acids are preferred for the compound which contains one carboxyl group and two or more hydroxyl groups which is the (a) component in a hydroxyl group containing resin obtained by copolymerizing (1) an acid compound which contains one carboxyl group and two or more hydroxyl groups, (b) a radically polymerizable monomer which contains epoxy groups and (c) other copolymerizable monomer which is the other hydroxyl group containing resin, and actual examples include 2,2-dimethylolbutanoic acid, 2,2-dimethylolpropionic acid, 2,2-dimethylolpentanoic acid and 2,2-dimethylolhexanoic acid. From among these 2,2-dimethylolbutanoic acid or 2,2-dimethylolpropionic acid provides a resin of low polarity with a high hydroxyl group value and which has excellent compatibility with the hardening agent and so these are preferred. One type of acid compound which has one carboxyl group and two or more hydroxyl groups may be used, or a mixture of two or more types may be used.

The acid compound of (a) provides the resin composition with hydroxyl groups by means of an addition reaction with the radically polymerizable monomer which has epoxy groups which is the (b) component. The addition reaction of the (a) component acid compound and the epoxy groups of the (b) component may be carried out before, during or after the copolymerization of the (b) component monomer and the (c) component monomer. The amount of the (a) component acid compound compounded depends on the amount of the (b) component and the hydroxyl group value of the resin composition, but the use of amount as a mol ratio with respect to the (b) component epoxy groups within the range up to 1.2 times is desirable. In those cases where the mol ratio of the (a) component with respect to the epoxy group is more than 1.2 there are cases where unreacted acid is precipitated out in the resin composition and this is undesirable. No particular limitation is imposed as a lower limit for the amount of the (a) component acid compound which is compounded but at least 5 mass % in the resin solid fraction is preferred. In those cases where the carboxyl groups of the (a) component acid compound are in excess of the (b) component epoxy groups the excess carboxyl groups of the (a) component acid compound cannot react with (b) component epoxy groups and so the (a)

component acid compound which does not have a polymerizable double bond remains unreacted and may be present in the hydroxyl group containing resin composition for painting purposes of this invention. On the other hand, in those cases where the (b) component epoxy groups are present in excess of the (a) component acid compound carboxyl groups the hydroxyl group containing resin obtained may have epoxy groups.

Actual examples of the radically polymerizable monomers which have epoxy groups which are the (b) component include glycidyl acrylate, glycidyl methacrylate, 3,4-epoxycyclohexylmethyl acrylate and 3,4-epoxycyclohexylmethyl methacrylate, and one type, or a mixture of two or more types, may be used.

Actual examples of the other radically polymerizable monomers which form the (c) component include methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, 2-ethylhexyl methacrylate, octyl methacrylate, lauryl methacrylate, stearyl methacrylate, acrylonitrile, methacrylonitrile, acrylamide, methacrylamide and, as radically polymerizable monomers which contain hydroxyl groups, 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, allyl alcohol, acrylic acid and versatic acid glycidyl ester adduct, methacrylic acid and versatic acid glycidyl ester adduct, and ethylene oxide and/or propylene oxide adducts of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate or 4-hydroxybutyl methacrylate. The other radically polymerizable monomers of the (c) component can be used individually or as mixtures of two or more types.

Furthermore, the lactone compound can be introduced into the copolymer hydroxyl group containing resin as the (c) component in those cases where a lactone modified radically polymerizable monomer such as a lactone modified (meth) acrylic acid ester has been used, and in those cases where the lactone modified radically polymerizable monomer has been copolymerized in such a way that the hydroxyl group value of the copolymer obtained is from 50 to 400 mgKOH/g and the structural unit based on the lactone compound content is from 20 to 70 mass % the copolymer obtained is a hydroxyl group containing lactone modified resin of this invention. The lactone modified radically polymerizable monomer is preferably a monomer where a lactone compound has been subjected to ring-opening addition with a hydroxyl group containing radically polymerizable monomer, and those where 3 or more mol of lactone compound have been added with ring-opening per 1 mol of hydroxyl group of the hydroxyl group containing radically polymerizable monomer are more desirable, those where 4 or more mol of lactone compound have been added with ring-opening are even more desirable, and those where from 4 to 6 mol of lactone compound have been added with ring opening are most desirable.

Lactone compounds such as ε-caprolactam can be made to undergo ring-opening addition reaction during the reaction of the abovementioned (a), (b) and (c) components. In this case the copolymer obtained is a hydroxyl group containing lactone modified resin of this invention in those cases where the hydroxyl group value of the copolymer obtained is from 50 to 400 mgKOH/g and the structural unit based on the lactone compound content is from 20 to 70 mass %.

The radical polymerization initiator and the radical polymerization conditions etc. should be the same as those in the case of the above-mentioned hydroxyl group containing acrylic resins.

The organic solvent which is used in the production of the hydroxyl group containing resin preferably has no functional groups which can react with the carboxyl groups of the (a) component or the epoxy groups of the (b) component, and the organic solvents noted in the section relating to the hydroxyl group containing acrylic resins described above are actual examples of such solvents, and it may be one type of organic solvent alone or it may be a mixed solvent comprising two or more types of solvent. At this time the solid fraction concentration of the hydroxyl group containing resin can be selected optionally with the range where the dispersion stability of the resin is not lost, but the solid fraction concentration generally is from 10 to 70 mass %.

The hydroxyl group containing lactone modified resin of (A) can be obtained by adding a lactone compound to the abovementioned hydroxyl group containing resin and bringing about a ring-opening addition reaction.

Examples of said lactone compound include β-methyl-δ-valerolactone, γ-valerolactone, δ-valerolactone, δ-caprolactone, γ-caprolactone, ε-caprolactone, β-propiolactone, γ-butyrolactone, γ-nonanoiclactone and δ-dodecanolactone, but ε-caprolactone is especially desirable. Just one of these lactone compounds alone or a combination of two or more types may be used. Furthermore, lactone compound modified (meth)acrylic acid esters can be used, and commercial products such as Praxel FM-1, Praxel FM-2, Praxel FM-3, Praxel FM-4 and the like produced by the Daiseru Kagaku Kogyo Co. are known.

The ring-opening addition reaction of the lactone compound is preferably carried out in the absence of a catalyst.

Furthermore, the ring-opening addition reaction of the lactone is preferably carried out in an organic solvent. The organic solvents described in the section relating to the hydroxyl group containing acrylic resin described above can be cited as actual examples of the organic solvent, and the solvent may be one type of organic solvent alone or a mixed solvent comprising a plurality of two or more types. At this time the solid fraction concentration of the hydroxyl group containing resin of (A) can be selected optionally with the range where the dispersion stability of the resin is not lost, but the solid fraction concentration generally is from 10 to 70 mass %.

The hydroxyl group and ring-structure containing acrylic resin of (B) which is used in the invention is an acrylic resin of which the hydroxyl group value is from 50 to 150 mgKOH/g and which includes from 10 to 80 mass % of structural units based on a radically polymerizable monomer which has a cyclic structure. The cyclic structure part of the acrylic resin raises the staining resistance of the paint film.

The preferred range for the hydroxyl group value of the hydroxyl group and cyclic structure containing acrylic resin of (B) is from 60 to 140 mgKOH/g, and most desirably the range is from 80 to 140 mgKOH/g. In those cases where the hydroxyl group value is less than 50 mgKOH/g the weather resistance of the paint film is inadequate, and in those cases where the hydroxyl group value exceeds 150 mgKOH/g the scratch resistance of the paint film is inadequate.

Furthermore, the structural unit based on radically polymerizable monomer which has a cyclic structure content is more desirably from 20 to 70 mass %, and most desirably from 30 to 70 mass %.

In those cases where the structural unit based on radically polymerizable monomer which has a cyclic structure content is less than 10 mass % the staining resistance of the paint film is inadequate, and in those cases where the structural unit based on radically polymerizable monomer which has a cyclic structure content exceeds 80 mass % the scratch resistance of the paint film is inadequate.

Here a cyclic structure with an at least five membered ring is preferred for the cyclic structure, a cyclic structure with an at least six membered ring is more desirable, and a cyclic structure with a from six to eight membered ring is most desirable. The cyclic structure may be an aromatic ring structure or an alicyclic structure. Furthermore, the cyclic structure part may have substituent groups. Examples of the substituent groups include hydrocarbyl groups such as the methyl and ethyl groups and halogen atoms such as the chlorine and bromine atoms.

The cyclic structure part content is preferably from 7 to 60 mass %, and most desirably from 20 to 55 mass %, of the hydroxyl group and cyclic structure containing acrylic resin of (B).

The weight average molecular weight of the hydroxyl group and cyclic structure containing acrylic resin of (B) which is used in the invention is preferably from 2,500 to 15,000, and most desirably from 2,500 to 12,000. In those cases where the weight average molecular weight is less than 2,500 the weather resistance of the paint film is inadequate, and in those cases where it exceeds 15,000 the appearance of the paint film declines.

The (B) component can be obtained by the normal radical copolymerization of a mixture of radically polymerizable monomer which has a cyclic structure, hydroxyl group containing radically polymerizable monomer and other radically polymerizable monomer in the usual organic solvents using the usual radical polymerization initiators.

Styrene, cyclohexyl methacrylate, cyclohexyl acrylate, isobornyl methacrylate, isobornyl acrylate, 3,3,5-trimethylcyclohexyl acrylate, 3,3,5-trimethylcyclohexyl methacrylate, 2-methyl-2-adamantyl methacrylate, 2-ethyl-2-adamantyl methacrylate, 2-methyl-2-adamantyl acrylate and 2-ethyl-2-adamantyl acrylate are actual radically polymerizable monomers which have a cyclic structure, and styrene, cyclohexyl methacrylate, cyclohexyl acrylate, isobornyl methacrylate and isobornyl acrylate are preferred from the viewpoint of both scratch resistance and staining resistance. One type, or two or more types, of radically polymerizable monomer which has a cyclic structure can be used.

Examples of the hydroxyl group containing radically polymerizable monomer include 2-hydroxyethyl acrylate, 2-hydroxypropyl acrylate, 3-hydroxypropyl acrylate, 2-hydroxybutyl acrylate, 4-hydroxybutyl acrylate, 6-hydroxyhexyl acrylate, acrylic acid and versatic acid glycidyl ester adducts, 2-hydroxyethyl methacrylate, 2-hydroxypropyl methacrylate, 3-hydroxypropyl methacrylate, 2-hydroxybutyl methacrylate, 4-hydroxybutyl methacrylate, 6-hydroxyhexyl methacrylate and methacrylic acid and versatic acid glycidyl ester adducts. One of these hydroxyl group containing radically polymerizable monomers may be used, or a combination of two or more types may be used.

However, the fact that the hydroxyl group and cyclic structure containing acrylic resin of (B) does not contain structural units based on a lactone compound is also desirable for raising the synergistic effect of the hydroxyl group containing lactone modified acrylic resin (A) and the hydroxyl group and cyclic structure containing resin (B).

Actual examples of the other radically polymerizable monomers include acrylic acid, methacrylic acid, maleic acid, fumaric acid, citraconic acid, itaconic acid, methyl acrylate, ethyl acrylate, n-propyl acrylate, isopropyl acrylate, n-butyl acrylate, isobutyl acrylate, sec-butyl acrylate, t-butyl acrylate, hexyl acrylate, cyclohexyl acrylate, 2-ethylhexyl acrylate, octyl acrylate, lauryl acrylate, stearyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, t-butyl methacrylate, hexyl methacrylate, cyclohexyl methacrylate, 2-ethylhexyl methacrylate, octyl methacrylate, lauryl methacrylate, stearyl methacrylate, isobornyl methacrylate, perfluoroalkyl acrylates, perfluoroalkyl methacrylates, adamantyl acrylate, adamantyl methacrylate, benzyl acrylate, benzyl methacrylate, phenyl acrylate, phenyl methacrylate, N-dimethylaminoethyl acrylate, N-dimethylaminoethyl methacrylate, styrene, acrylonitrile, methacrylonitrile, acrylamide, methacrylamide and vinyl acetate. One of these other radically polymerizable monomers may be used, or a combination of two or more types may be used.

The radical polymerization initiator, solvent, and radical polymerization conditions etc. should be the same conditions as in the case of the aforementioned hydroxyl group containing resin.

The mass ratio of the resin solid fractions (A)/(B) is preferably from 95/5 to 20/80. More desirably it is from 90/10 to 30/70, and most desirably from 90/10 to 50/50. In those cases where the proportion of (A) is more than 95/5 the staining resistance of the paint film declines, and in those cases where the proportion of (B) is more than 80/20 the scratch resistance of the paint film falls.

No particular limitation is imposed upon the isocyanate compound which hardens the (A)/(B) mixture, but a polyisocyanate compound which has in one molecule two or more isocyanate groups and/or blocked isocyanate groups is preferred. Actual examples of polyisocyanate compounds which have in one molecule two or more isocyanate groups include the compounds known as isocyanate monomers such as hexamethylene diisocyanate, isophorone diisocyanate, tolylene diisocyanate, diphenylmethane diisocyanate, xylylene diisocyanate and dicyclohexylmethane-4,4-diisocyanate, and the poly-isocyanate derivatives such as the biuret forms, isocyanurate forms and adduct such as trimethylolpropane forms of these compounds. One of these polyisocyanate compounds may be used, or a combination of two or more types may be used.

The proportions of the mixture of (A) and (B) and the isocyanate compound are determined by the proportion of the functional groups which take part in the reaction, and the equivalent ratio of the total hydroxyl group equivalent of the two types of hydroxyl group containing resins of (A) and (B) and the isocyanate compound is preferably within the range from 0.5/1 to 1/0.5. More desirably the equivalent ratio is from 0.7/1 to 1/0.7, and most desirably it is from 0.8/1 to 1/0.8. In those cases where the hydroxyl group equivalent ratio is smaller than 0.5/1.0 the weather resistance is inadequate, and in those cases where it is greater than 1/0.5 the solvent resistance is inadequate.

As well as the abovementioned components, ultraviolet absorbers such as the benzotriazole based ultraviolet absorbers, triazine based ultraviolet absorbers and oxalic acid anilide based ultraviolet absorbers, photo-stabilizers such as the hindered amine based photo-stabilizers, antioxidants such as the phenol based antioxidants, the phosphite based antioxidants and the thioether based antioxidants, viscosity controlling agents such as fine organic resin particles, fatty acid amide waxes, polyamide waxes, polyethylene based waxes, polyethylene oxide based waxes, silica, organic bentonite and urea compound based viscosity controlling agents, surface controlling agents such as the silicone based surface treating agents and vinyl compound based surface controlling agents, and antifoaming agents such as the silicone based antifoaming agents and the vinyl compound based antifoaming agents can be compounded appropriately in a heat-hardenable paint composition of this invention. Furthermore, inorganic color pigments such as titanium oxide, flowers of zinc, yellow iron oxide, red iron oxide and carbon black, organic color pigments such as phthalocyanine blue, indanthrene blue, phthalocyanine green, insoluble azo, soluble azo, perylene, quinacridone red, thioindigo red, dioxazine violet, anthrapyrimidine yellow and quinophthalone yellow, and glitter pigments such as aluminum powder, nickel powder, pearl mica and the like, can be compounded appropriately as color pigments.

Organic solvents can be compounded in the heat-hardenable compositions of this invention. Examples of the organic solvents include aromatic hydrocarbons such as benzene, toluene, xylene, ethylbenzene, aromatic petroleum naphtha, tetralin, terpene oils, Solvesso #100 (trade name, produced by the Exxon Chemical Co.) and Solvesso #150 (trade name, produced by the Exxon Chemical Co.), aliphatic hydrocarbons such as hexane, heptane and octane, alicyclic hydrocarbons such as cyclohexane, ethers such as dioxane and tetrahydro-furan, esters and ether-esters such as methyl acetate, ethyl acetate, n-propyl acetate, isopropyl acetate, n-butyl acetate, isobutyl acetate, sec-butyl acetate, amyl acetate, and methoxybutyl acetate, ketones such as acetone, methyl ethyl ketone, methyl isobutyl ketone, methyl amyl ketone, cyclohexanone, isophorone, methyl isoamyl ketone, ethyl amyl ketone, diisobutyl ketone, diethyl ketone, methyl propyl ketone and diisopropyl ketone, phosphoric acid esters such as trimethyl phosphate, triethyl phosphate and tributyl phosphate, dimethylsulfoxide and N,N-dimethylformamide. One type of organic solvent can be used, or a combination of two or more types may be used.

The thermosetting compositions of this invention can be used in the top-coat paints which are painted on objects which are to be coated such as metal materials and resin materials. The thermosetting compositions of this invention may be coated as they are as top-coat paints on the object which is to be painted, or they may be painted over an undercoat or mid-coat paint film. The painting method may be simple one-coat painting, two-coat painting or three-coat painting in combination with a base coat, or over-coat painting on a top-coat paint film. The thermosetting compositions of this invention can be used as clear paints and they can also be used as enamel paints which contain pigments or glitter materials.

ILLUSTRATIVE EXAMPLES

The invention is described in more detail below by means of examples and comparative examples. Moreover, in the absence of any other indication the terms "parts" and "%" signify "parts by mass" and "mass %".

Example of Production 1

The Production of A-1 to A-3, A-5 and A-7

The amounts of methoxypropyl acetate shown in Table 1 were introduced as reaction solvent into a four-necked flask which had been furnished with a thermometer, a stirrer, a reflux condenser and a dropping funnel and the temperature was raised to 140° C. Then the mixture of monomer and polymerization initiator designated as the drip-feed component was drip-fed from the dropping funnel over a period of 2 hours. After the drip feed had been completed the reflux temperature was maintained for 1 hour and then the contents were cooled to 100° C. The supplementary catalyst was added dropwise after the cooling to 100° C. Subsequently on maintaining the temperature at 100° C. for 3 hours the polymerization reaction was completed and solutions of the resins A-1 to A-3, A-5 and A-7 were obtained.

Moreover, in the table "Praxel FM-4" is a monomer where 4 mol of $\epsilon$-caprolactam had been added to 1 mol of the hydroxyl group of hydroxyethyl methacrylate and this had been purchased from the Daiseru Kagaku Kogyo Co.

Example of Production 2

The Production of A-4 and A-6

The amounts of methoxypropyl acetate and 2,2-dimethylolbutanoic acid shown in Table 1 were introduced into a four-necked flask which had been furnished with a thermometer, a stirrer, a reflux condenser and a dropping funnel and heated, while being stirred under a current of nitrogen, and maintained at 140° C. Then the mixture of monomer and polymerization initiator designated as the drip-feed component was drip-fed from the dropping funnel over a period of 2 hours at a temperature of 140° C. After the drip feed had been completed the temperature of 140° C. was maintained for 1 hour and then the reaction temperature was reduced to 110° C. Subsequently the supplementary catalyst was added dropwise and, after maintaining a temperature of 110° C. for 2 hours, the s-caprolactam was introduced and the reaction was completed by maintaining a temperature of 150° C. for 3 hours and the resins A-4 and A-6 were obtained.

TABLE 1

|  |  | A-1 | A-2 | A-3 | A-4 | A-5 | A-6 | A-7 |
| --- | --- | --- | --- | --- | --- | --- | --- | --- |
| Methoxypropyl acetate | | 32 | 32 | 32 | 34 | 32 | 34 | 32 |
| 2,2-Dimethylolbutanoic acid | | | | | 20.0 | | 22.3 | |
| Drip Feed Component | Glycidyl methacrylate | | | | 19.8 | | 21.0 | |
| | n-Butyl methacrylate | 0.8 | 5.0 | 9.2 | 5.2 | 1.2 | 4.7 | 32 |
| | n-Butyl acrylate | | 4.8 | 10.4 | | | 3.0 | 6.2 |
| | Acrylic acid | 0.4 | 0.4 | 0.4 | | 0.8 | | 0.8 |
| | Praxel FM-4 | 31 | 46 | 39 | | 58 | | 20 |
| | 2-Ethylhexyl methacrylate | 27.8 | 3.8 | 1 | | | | 1 |
| | t-Butylperoxy-2-ethylhexanoate | 5 | 5 | 5 | 3 | 5 | 3 | 5 |

TABLE 1-continued

|  |  | A-1 | A-2 | A-3 | A-4 | A-5 | A-6 | A-7 |
|---|---|---|---|---|---|---|---|---|
| Supplementary Catalyst | t-Butylperoxybenzoate | 0.2 | 0.2 | 0.2 | 0.2 | 0.2 | 0.2 | 0.2 |
|  | Xylene | 2.8 | 2.8 | 2.8 | 2.8 | 2.8 | 2.8 | 2.8 |
| ε-Caprolactone |  |  |  |  | 1.5 |  | 9 |  |
| Total |  | 100 | 100 | 100 | 100 | 100 | 100 | 100 |
| Property Values | Lactone content (mass %) | 40 | 60 | 50 | 25 | 75 | 15 | 26 |
|  | Hydroxyl group value (mgKOH/g) | 250 | 100 | 70 | 380 | 93 | 420 | 40 |
|  | Weight average molecular weight | 5500 | 5500 | 5500 | 7000 | 5500 | 7000 | 5500 |

Example of Production 3

The Production of D-1 to B-7

The xylene shown in Table 1 was introduced as reaction solvent into a four-necked flask which had been furnished with a thermometer, a stirrer, a reflux condenser and a dropping funnel and the temperature was raised to 140° C. Then the mixture of monomer and polymerization initiator designated as the drip-feed component was drip-fed from the dropping funnel over a period of 2 hours. After the drip feed had been completed the reflux temperature was maintained for 1 hour and then the contents were cooled to 100° C. After cooling to 100° C. the supplementary catalyst was added dropwise. Subsequently on maintaining the temperature at 100° C. for 3 hours the polymerization reaction was completed and solutions of the resins B-1 to B-7 were obtained.

TABLE 2

|  |  | B-1 | B-2 | B-3 | B-4 | B-5 | B-6 | B-7 |
|---|---|---|---|---|---|---|---|---|
| Xylene |  | 31 | 31 | 31 | 31 | 31 | 31 | 31 |
| Drip Feed Component | Styrene | 24 |  |  |  |  |  |  |
|  | Cyclohexyl methacrylate |  | 42 |  |  |  | 51 |  |
|  | Cyclohexyl acrylate |  |  | 42 |  |  |  |  |
|  | Isobornyl methacrylate |  |  |  | 12 |  |  | 3 |
|  | Isobornyl acrylate |  |  |  |  | 12 |  |  |
|  | n-Butyl methacrylate | 10 |  | 8 | 10 | 20 |  | 30 |
|  | n-Butyl acrylate | 11.3 | 8 |  | 17.8 | 7.8 | 2 | 3.5 |
|  | 2-Hydroxyethyl methacrylate | 7 | 7 | 7 | 12 | 12 |  | 12 |
|  | 2-Hydroxypropyl methacrylate | 7.7 | 3 | 3 | 8.2 | 8.2 | 7 | 11.5 |
|  | t-Butylperoxy-2-ethylhexanoate | 6 | 6 | 6 | 6 | 6 | 6 | 6 |
| Supplementary Catalyst | t-Butylperoxybenzoate | 0.2 | 0.2 | 0.2 | 0.2 | 0.2 | 0.2 | 0.2 |
|  | Xylene | 2.8 | 2.8 | 2.8 | 2.8 | 2.8 | 2.8 | 2.8 |
| Total |  | 100 | 100 | 100 | 100 | 100 | 100 | 100 |
| Property Values | Radically polymerizable monomer which has a cyclic structure content (mass %) | 40 | 70 | 70 | 20 | 20 | 85 | 5 |
|  | Hydroxyl group Value (mgKOH/g) | 100 | 70 | 70 | 140 | 140 | 45 | 160 |
|  | Weight average molecular weight | 5,000 | 5,000 | 5,000 | 5,000 | 5,000 | 5,000 | 5,000 |

Examples 1 to 5

The Production of Clear Paints

The raw materials shown in Table 3 were mixed sequentially and stirred until a uniform mixture was obtained to produce clear paints.

Comparative Examples 1 to 7

The Production of Clear Paints

The raw materials shown in Table 4 were mixed sequentially and stirred until a uniform mixture was obtained to produce clear paints.

TABLE 3

|  | Example 1 | Example 2 | Example 3 | Example 4 | Example 4 |
|---|---|---|---|---|---|
| A-1 | 35.0 |  |  |  |  |
| A-2 |  | 56.0 |  |  | 18.0 |
| A-3 |  |  | 31.0 |  |  |
| A-4 |  |  |  | 27.0 |  |
| A-5 |  |  |  |  |  |
| A-6 |  |  |  |  |  |
| A-7 |  |  |  |  |  |
| B-1 | 15.0 |  |  |  |  |
| B-2 |  | 6.2 |  |  |  |
| B-3 |  |  |  | 18.0 |  |
| B-4 |  |  | 31.0 |  |  |
| B-5 |  |  |  |  | 42.0 |
| B-6 |  |  |  |  |  |
| B-7 |  |  |  |  |  |

TABLE 3-continued

|  | Example 1 | Example 2 | Example 3 | Example 4 | Example 4 |
|---|---|---|---|---|---|
| Desmodure N3200 | 20.0 | 11.8 | 12.7 | 22.5 | 15.0 |
| Tinuvin 900 | 1.0 | 1.0 | 1.0 | 1.0 | 1.0 |
| Tinuvin 292 | 0.5 | 0.5 | 0.5 | 0.5 | 0.5 |
| BYK-300 | 0.1 | 0.1 | 0.1 | 0.1 | 0.1 |
| Solvesso 100 | 28.4 | 24.4 | 23.7 | 30.9 | 23.4 |
| Total | 100 | 100 | 100 | 100 | 100 |
| (A)/(B) Mass ratio |  |  |  |  |  |
| (A) | 70 | 90 | 50 | 60 | 40 |
| (B) | 30 | 10 | 50 | 40 | 60 |

TABLE 4

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| A-1 |  |  |  | 28.0 | 25.0 |  |  |
| A-2 |  |  |  |  |  | 8.5 | 60.0 |
| A-3 |  |  |  |  |  |  |  |
| A-4 |  |  |  |  |  |  |  |
| A-5 | 31.0 |  |  |  |  |  |  |
| A-6 |  | 23.0 |  |  |  |  |  |
| A-7 |  |  | 35.0 |  |  |  |  |
| B-1 | 31.0 |  |  |  |  |  |  |
| B-2 |  | 23.0 | 35.0 |  |  |  | 1.2 |
| B-3 |  |  |  |  |  |  |  |
| B-4 |  |  |  |  |  |  |  |
| B-5 |  |  |  |  |  | 48.2 |  |
| B-6 |  |  |  | 28.0 |  |  |  |
| B-7 |  |  |  |  | 25.0 |  |  |
| Desmodure N3200 | 11.7 | 22.0 | 7.5 | 16.1 | 20.0 | 14.8 | 11.9 |
| Tinuvin 900 | 1.0 | 1.0 | 1.0 | 1.0 | 1.0 | 1.0 | 1.0 |
| Tinuvin 292 | 0.5 | 0.5 | 0.5 | 0.5 | 0.5 | 0.5 | 0.5 |
| BYK-300 | 0.1 | 0.1 | 0.1 | 0.1 | 0.1 | 0.1 | 0.1 |
| Solvesso 100 | 24.7 | 30.4 | 20.9 | 26.3 | 28.4 | 26.9 | 25.3 |
| Total | 100 | 100 | 100 | 100 | 100 | 100 | 100 |
| (A)/(B) Mass Ratio |  |  |  |  |  |  |  |
| (A) | 50 | 50 | 50 | 50 | 50 | 15 | 98 |
| (B) | 50 | 50 | 50 | 50 | 50 | 85 | 2 |

Notes for Table 3 and Table 4
1) Desmodure N3200: Trade name, a liquid HDI biuret type resin (involatile fraction 100 mass %, NCO content 23 mass %), produced by the Sumika Beyer Urethane Co.
2) Tinuvin 900: Ultraviolet absorber, trade name, 20 mass % xylene solution produced by the Ciba Speciality Chemicals Co.
3) Tinuvin 292: Photo-stabilizer, trade name, 20 mass % xylene solution produced by the Ciba Speciality Chemicals Co.
4) BYK-300: Surface controlling agent, trade name, 10 mass % xylene solution produced by the Bikkukemi Co.
5) Solvesso 100: Trade name, aromatic petroleum naphtha, produced by the Esso Co.

Production of Test Specimens and Investigation of the Paint Film Performance

The cationic electro-deposition paint Aqua No. 4200 (trade name, produced by the BASF Coatings Japan Co.) was plated at 175° C. for 25 minutes by electro-deposition painting so as to provide a dry film thickness of 20 µm on a zinc phosphate treated mild steel sheet and then the mid-coat paint Hi-epicoat No. 560 (trade name, produced by the BASF Coatings Japan Co.) was air-spray painted so as to provide a dry film thickness of 30 µm and then baked for 30 minutes at 140° C. Then Belcoat No. 600 black (trade name, produced by the BASF coatings Japan Co., paint color: black) which is a solvent-based base-coat paint was air-spray painted in such a way as to provide a dry film thickness of 15 µm and, after setting for 3 minutes at 20° C., the clear paint diluted with Solvesso 100 (trade name, produced by the Esso Co., aromatic petroleum naphtha) to the painting viscosity (Ford cup No. 4, 25 seconds at 20° C.) was air-spray painted wet-on-wet in such a way as to provide a dry film thickness of 40 µm and baked at 140° C. for 30 minutes to provide a test specimen.

Moreover, in all of the examples, for the staining resistance test sheets only the base-coat paint was replaced by Belcoat No. 6000 white (trade name, produced by the BASF coatings Japan Co., paint color: white).

The paint film performance of the test specimens obtained was evaluated using the methods of evaluation outlined below.

(1) Appearance
The appearance was evaluated by visual observation in accordance with the following criteria.
◯: When a fluorescent lamp was reflected in the paint film the fluorescent lamp was reflected distinctly.
Δ: When a fluorescent lamp was reflected in the paint film the outline (profile) of the fluorescent lamp was slightly blurred.
X: When a fluorescent lamp was reflected in the paint film the outline (profile) of the fluorescent lamp was markedly blurred.

(2) Scratch Resistance Against Car Washing Machine
Scratch Resistance: Muddy water (JIS Z-8901-84 a 10/99/1 mixture of type 8 dust/water/neutral detergent) was applied with a brush to the test sheet and then it was cleaned with a car-wash brush rotating at 150 rpm for 10 seconds in an automatic car-wash machine and the test sheet was rinsed with flowing water. This procedure was repeated twice and then the extent of scratching of the test sheet surface was determined by measuring the L* value with a color difference meter (CR-331, produced by the Minolta Camera Co.). The ΔL* value was calculated using the following equation and the scratch resistance was evaluated on the basis of this value.

$\Delta L^*\text{Value} = L^*\text{Value after Testing} - L^*\text{Value Before Testing}$ ⊚: ΔL* value less than 1
◯: ΔL* value 1 or above but less than 2
Δ: ΔL* value 2 or above but less than 3
X: ΔL* value 3 or above (3) Acid Resistance
Sulfuric acid (40 mass %, 2 ml) was placed as a spot on the test specimen and left to stand for 30 minutes at 60° C. and then any abnormality of the paint film was assessed visually.
◯: No abnormality of the paint film
Δ: Reduced gloss
X: Marked loss of gloss (4) Solvent Resistance
The change in appearance when load of 1 kgf was applied to a gauze which had been moistened with xylene and reciprocated ten times was assessed on the basis of the following criteria.

○: No change
Δ: Partial dissolution
X: Complete dissolution
(5) Weather Resistance The state of the paint film was assessed visually after being exposed for 3000 hours using a sunshine carbon arc lamp type accelerated weather resistance testing machine (JIS K-5400 (1990) 9.8.1).
○: No abnormality in the paint film
Δ: Reduced gloss
X: Marked loss of gloss
(6) Staining Resistance Dirty water (JIS Z-8901-84 a 1.3/98/0.5/0.2 by mass mixture of type 8 dust/water/carbon black/yellow ochre) was coated onto the test sheet and then dried for 10 minutes at 50° C. and, after carrying out eight of these cycles, the paint film was cleaned with a fixed force with a polishing cloth while rinsing with water and the extent to which staining remained was assessed by measuring the L* value with a color difference meter (CR-331, produced by the Minolta Camera Co.). The ΔL* value was then calculated using the following equation and the staining resistance was evaluated on the basis of this value.

ΔL*Value=L*Value after Testing–L*Value Before Testing

◉: ΔL* value less than 2
○: ΔL* value 2 or above but less than 4
Δ: ΔL* value 4 or above but less than 8
X: ΔL* value 8 or above

TABLE 5

|  | Example 1 | Example 2 | Example 3 | Example 4 | Example 5 |
|---|---|---|---|---|---|
| Appearance | ○ | ○ | ○ | ○ | ○ |
| Acid Resistance | ○ | ○ | ○ | ○ | ○ |
| Scratch resistance against car washing machine | ◉ | ○ | ○ | ○ | ○ |
| Solvent Resistance | ○ | ○ | ○ | ○ | ○ |
| Weather Resistance | ○ | ○ | ○ | ○ | ○ |
| Staining Resistance | ◉ | ○ | ○ | ○ | ○ |

TABLE 6

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Appearance | ○ | X | ○ | ○ | ○ | ○ | ○ |
| Acid Resistance | ○ | ○ | Δ | ○ | ○ | ○ | ○ |
| Scratch resistance against car washing machine | ○ | X | ○ | X | X | X | ○ |
| Solvent Resistance | ○ | ○ | ○ | ○ | ○ | ○ | ○ |
| Weather Resistance | ○ | X | X | X | ○ | ○ | ○ |
| Staining Resistance | X | ○ | ○ | ○ | X | ○ | X |

With Examples 1 to 5 the paint film scratch resistance against car washing machine, staining resistance, appearance, acid resistance, weather resistance and solvent resistance were good. In Comparative Example 1 the amount of lactone compound in the hydroxyl group containing resin (A) was too high and so the staining resistance of the paint film was inadequate. In Comparative Example 2 the hydroxyl group value of the hydroxyl group containing resin (A) was too high and so the appearance of the paint film was inadequate. Moreover, in Comparative Example 2 the amount of lactone compound of the hydroxyl group containing resin (A) was small and so the car-wash damage resistance of the paint film was inadequate. In Comparative Example 3 the hydroxyl group value of the hydroxyl group containing resin (A) was too low and so the weather resistance and the acid resistance of the paint film were inadequate. In Comparative Example 4 the amount of radically polymerizable monomer which had a cyclic structure of the hydroxyl group containing resin (B) was too high and so the car-wash damage resistance was inadequate. Moreover, in Comparative Example 4 the hydroxyl group value of the hydroxyl group containing resin (B) was too low and so the weather resistance of the paint film was inadequate. In Comparative Example 5 the amount of radically polymerizable monomer which has a cyclic structure of the hydroxyl group containing resin (B) was too small and so the staining resistance of the paint film was inadequate. Moreover, in Comparative Example 5 the hydroxyl group value of the hydroxyl group containing resin (B) was too high and so the car-wash damage resistance of the paint film was inadequate. In Comparative Example 6 the proportion of (A) in the mass ratio of the hydroxyl group containing resins (A)/(B) was too high and so scratch resistance against ca washing machine of the paint film was inadequate. In Comparative Example 7 the proportion of (A) in the mass ratio of the hydroxyl group containing resins (A)/(B) was too low and so the scratch resistance against car washing machine of the paint film was inadequate.

The thermosetting paint compositions of this invention can be used for painting of various types and in particular they can be used ideally as automobile paints.

We claim:
1. A heat-hardenable paint composition comprising a base resin, wherein the base resin comprises:
(A) a lactone modified acrylic resin comprising hydroxyl groups, wherein:
20 to 70 weight percent of the structural units are based on a lactone compound; and the hydroxyl group value is from 50 to 400 mg KOH/g, and wherein the lactone modified acrylic resin comprising hydroxyl groups (A) comprises a reaction product of a ring-opening addition reaction of a lactone with a hydroxyl group containing resin produced by copolymerization of:
(a) an acid compound comprising one carboxyl group and two or more hydroxyl groups;
(b) a radically polymerizable monomer comprising epoxy groups; and
(c) other radically polymerizable monomers; and

(B) an acrylic resin comprising hydroxyl groups and cyclic structures, wherein:
10 to 80 weight percent of structural units are based on a radically polymerizable monomer comprising a cyclic structure; and the hydroxyl group value is from 50 to 150 mg KOH/g; and
a crosslinking resin comprising an isocyanate compound; wherein the weight ratio of the solid fractions of (A):(B) in the base resin is from 95:5 to 20:80.

2. The heat-hardenable paint composition of claim 1, wherein the radically polymerizable monomer comprising a cyclic structure is selected from the group consisting of styrene, cyclohexyl methacrylate, cyclohexyl acrylate, isobornyl methacrylate, isobornyl acrylate, and a combination thereof.

3. The heat-hardenable paint composition of claim 1, wherein the acid compound (a) is selected from the group consisting of 2,2-dimethylolbutanoic acid, 2,2-dimethylolpropionic acid, and a combination thereof.

4. The heat-hardenable paint composition of claim 1, wherein the lactone modified radically polymerizable monomer comprising hydroxyl groups comprises a reaction product of a ring-opening addition reaction of a lactone with a hydroxyl group containing radically polymerizable monomer, wherein at least 3 mol of lactone have been added by ring opening per 1 mol of hydroxyl group of the hydroxyl group containing monomer.

5. The heat-hardenable paint composition of claim 1, wherein the lactone modified acrylic resin comprising hydroxyl groups (A) comprises:
a copolymerized lactone modified radically polymerizable monomer with hydroxyl groups consisting of a reaction product of a ring-opening addition reaction of a lactone with a hydroxyl group containing radically polymerizable monomer selected from the group consisting of 2-hydroxyethyl acrylate, 2-hydroxypropyl acrylate, 3-hydroxypropyl acrylate, 2-hydroxybutyl acrylate, 4-hydroxybutyl acrylate, 6-hydroxyhexyl acrylate, 2-hydroxyethyl methacrylate, 2-hydroxypropyl methacrylate, 3-hydroxypropyl methacrylate, 2-hydroxybutyl methacrylate, 4-hydroxybutyl methacrylate, 6-hydroxyhexyl methacrylate; ethylene oxide adducts of 2-hydroxyethyl acrylate, propylene oxide adducts of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, and combinations thereof; and
at least one other copolymerized radically polymerizable monomer selected from the group consisting of methyl acrylate, ethyl acrylate, n-propyl acrylate, isopropyl acrylate, n-butyl acrylate, isobutyl acrylate, sec-butyl acrylate, t-butyl acrylate, hexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, t-butyl methacrylate, hexyl methacrylate, 2-ethylhexyl methacrylate, octyl methacrylate, lauryl methacrylate, stearyl methacrylate, isobornyl methacrylate, perfluoroalkyl acrylates, perfluoroalkyl methacrylates, N-methylaminoethyl acrylate, N-dimethylaminoethyl methacrylate, acrylonitrile, methacrylonitrile, acrylamide, methacrylamide, vinyl acetate, acrylic acid, methacrylic acid, maleic acid, fumaric acid, carboxyl group containing radically polymerizable monomers, and combinations thereof.

6. The heat-hardenable paint composition of claim 1, wherein the radically polymerizable monomer comprising a cyclic structure is selected from the group consisting of cyclohexyl methacrylate, cyclohexyl acrylate, isobornyl methacrylate, isobornyl acrylate, and a combination thereof.

* * * * *